(12) United States Patent
Owoeye et al.

(10) Patent No.: US 11,940,064 B2
(45) Date of Patent: Mar. 26, 2024

(54) THREADED TUBULAR CONNECTION

(71) Applicant: Saudi Arabian Oil Company, Dhahran (SA)

(72) Inventors: Oladele Owoeye, Dhahran (SA); Jasem Moyaibed, Tarut (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/843,180

(22) Filed: Jun. 17, 2022

(65) Prior Publication Data

US 2023/0408000 A1  Dec. 21, 2023

(51) Int. Cl.
*F16L 15/00* (2006.01)
*E21B 17/042* (2006.01)
*F16L 15/06* (2006.01)

(52) U.S. Cl.
CPC ........ *F16L 15/002* (2013.01); *E21B 17/0423* (2013.01); *F16L 15/003* (2013.01); *F16L 15/06* (2013.01)

(58) Field of Classification Search
CPC ....... F16L 15/06; F16L 15/001; F16L 15/002; F16L 15/003; F16L 15/007; F16L 15/008; E21B 17/042; E21B 17/0423
See application file for complete search history.

(56) References Cited

U.S. PATENT DOCUMENTS

| | | |
|---|---|---|
| 2,772,102 A | 11/1956 | Webb |
| 3,109,672 A | 11/1963 | Franz |
| 3,467,413 A | 9/1969 | Madrelle |
| 4,384,737 A | 5/1983 | Reusser |
| 4,458,925 A | 7/1984 | Raulins et al. |
| 4,564,225 A | 1/1986 | Taylor |
| 4,598,455 A * | 7/1986 | Morris .................. F16L 15/007 285/15 |

(Continued)

FOREIGN PATENT DOCUMENTS

| | | |
|---|---|---|
| CN | 201121782 | 9/2008 |
| EP | 1101057 | 10/2006 |

(Continued)

OTHER PUBLICATIONS

Dong et al., "Design and Mechanical Behavior Study of Ultrahigh-Torque Variable Pitch Casing Joint," Advances in Mechanical Engineering, Jan. 2019, 11(1):1-12, 12 pages.

(Continued)

*Primary Examiner* — David Bochna
(74) *Attorney, Agent, or Firm* — Fish & Richardson P.C.

(57) ABSTRACT

A tubular connection includes a tubular joint including a pin with a first pin thread having a first pitch and a second pin thread having a second pitch, and also includes a connector that includes a box with a first box thread having the first pitch and a second box thread having the second pitch. The connection also includes an elastomeric seal ring comprised of a material that swells in the presence of hydrocarbons. Upon make-up of the connection, the first pin thread engages with the first box thread, the second pin thread engages with the second box thread, and the elastomeric seal ring is disposed around the tubular joint between the first pin thread and the second pin thread and forms a metal-to-elastomer seal between the tubular joint and the connector.

18 Claims, 4 Drawing Sheets

(56) References Cited

U.S. PATENT DOCUMENTS

| | | | |
|---|---|---|---|
| 4,616,537 A * | 10/1986 | Axford | E21B 17/042 82/110 |
| 4,728,129 A * | 3/1988 | Morris | F16L 15/007 285/334 |
| 4,732,416 A | 3/1988 | Dearden | |
| 4,786,090 A | 11/1988 | Mott | |
| 4,795,200 A | 1/1989 | Tung | |
| 4,796,923 A * | 1/1989 | Liggins | E21B 17/0423 285/27 |
| 4,893,844 A * | 1/1990 | Chelette | E21B 17/042 285/924 |
| 5,040,827 A | 8/1991 | DeLange | |
| 5,064,224 A | 11/1991 | Tai | |
| 5,212,885 A | 5/1993 | Buonodono et al. | |
| 5,360,239 A | 11/1994 | Klementich | |
| 5,429,374 A | 7/1995 | Eichenberger | |
| 5,687,999 A | 11/1997 | Lancry et al. | |
| 6,158,785 A | 12/2000 | Beaulier et al. | |
| 7,578,043 B2 | 8/2009 | Simpson et al. | |
| 7,850,211 B2 | 12/2010 | Reynolds, Jr. et al. | |
| 7,997,627 B2 | 8/2011 | Sugino et al. | |
| 8,029,025 B1 * | 10/2011 | Sivley, IV | E21B 17/0423 285/333 |
| 8,136,846 B2 | 3/2012 | Church | |
| 8,882,157 B2 | 11/2014 | Chelette et al. | |
| 9,677,346 B2 * | 6/2017 | Hou | F16L 15/002 |
| 10,443,318 B2 | 10/2019 | Finke | |
| 2004/0017081 A1 | 1/2004 | Simspon et al. | |
| 2004/0104575 A1 | 6/2004 | Ellington et al. | |
| 2007/0132239 A1 | 6/2007 | Reynolds | |
| 2007/0164565 A1 * | 7/2007 | Evans | F16L 15/007 285/333 |
| 2010/0181727 A1 | 7/2010 | Santi et al. | |
| 2012/0032435 A1 * | 2/2012 | Carcagno | F16L 15/003 285/390 |
| 2014/0084582 A1 * | 3/2014 | Elder | F16L 15/002 285/334 |
| 2015/0316181 A1 | 11/2015 | Tejeda et al. | |
| 2016/0130885 A1 * | 5/2016 | Liu | E21B 17/042 285/390 |
| 2017/0114942 A1 | 4/2017 | Mclaughlin | |
| 2018/0252343 A1 | 9/2018 | Evans et al. | |
| 2018/0328119 A1 * | 11/2018 | Juarez | F16L 15/002 |
| 2019/0211631 A1 | 7/2019 | Yamaguchi | |
| 2020/0278056 A1 | 9/2020 | Oku et al. | |
| 2020/0332930 A1 * | 10/2020 | Wajnikonis | F16L 15/002 |
| 2021/0317856 A1 | 10/2021 | Harvey et al. | |
| 2022/0341519 A1 | 10/2022 | Larson | |
| 2023/0072067 A1 * | 3/2023 | Wajnikonis | F16L 15/002 |
| 2023/0349241 A1 | 11/2023 | Owoeye et al. | |

FOREIGN PATENT DOCUMENTS

| | | |
|---|---|---|
| WO | WO 1993018330 | 9/1993 |
| WO | WO 2019055295 | 3/2019 |

OTHER PUBLICATIONS

Zhang et al., "Experimental Research on Connection Performance of Variable-Pitch Threaded Casing," Advanced Materials Research, Sep. 2013, 805-806:1805-1811.

* cited by examiner

THREADED TUBULAR CONNECTION

TECHNICAL FIELD

This disclosure relates to the production of oil, gas, or other resources from subterranean zones to the surface.

BACKGROUND

Hydrocarbons trapped in subsurface reservoirs can be raised to the surface of the Earth (that is, produced) through wellbores formed from the surface to the subsurface reservoirs. Various strings or tubular members, such as drilling strings, production strings or casing strings, can be disposed within the wellbores to effectuate such production. Such strings can be comprised of individual tubular sections, or joints, which can be connected to each other with threaded connections. Connection failure (for example, thread jump-out under tensile load) can occur, for example, during casing deployment or cementing operations and can result in increased cost, increased non-productive time, and environmental and safety risks.

SUMMARY

Certain aspects of the subject matter herein can be implemented as threaded tubular connection. The connection includes a tubular joint that includes a pin at its distal end and configured to be disposed within a wellbore. The tubular joint includes a first pin thread disposed on an external surface of the pin that that has a first pitch and a second pin thread disposed on the external surface of the pin between the first pin thread and an unthreaded portion of the tubular joint. The second pin thread has a second pitch different from the first pitch. The connection also includes a connector that includes a box with a first box thread disposed on an interior surface of the box that is the same as the first pitch as the pin. The connector also includes a second box thread disposed on the interior surface and having a pitch that is the same as the second pitch of the pin. The connection also includes an elastomeric seal ring comprised of a material that swells in the presence of hydrocarbons. The connection is configured so that, upon make-up of the connection, the first pin thread engages with the first box thread, the second pin thread engages with the second box thread, and the elastomeric seal ring is disposed around the tubular joint between the first pin thread and the second pin thread and forms a metal-to-elastomer seal between the tubular joint and the connector.

An aspect combinable with any of the other aspects can include the following features. The elastomeric seal ring can be disposed in a groove disposed about the exterior surface of the pin between the first pin thread and the second pin thread.

An aspect combinable with any of the other aspects can include the following features. The pin can be tapered with respect to a longitudinal axis of the tubular joint.

An aspect combinable with any of the other aspects can include the following features. The first pin thread can be a buttress thread.

An aspect combinable with any of the other aspects can include the following features. The first pin thread can be dimensioned so as to be compatible with a box thread of a standard American Petroleum Institute (API) coupling.

An aspect combinable with any of the other aspects can include the following features. The first pin thread can have a length along a longitudinal axis of the tubular joint that is substantially equivalent to a length along a longitudinal axis of a tubular joint of a standard American Petroleum Institute (API) coupling.

An aspect combinable with any of the other aspects can include the following features. The first pin thread and the second pin thread can be constant-pitch threads.

An aspect combinable with any of the other aspects can include the following features. The first pitch can be greater than the second pitch.

An aspect combinable with any of the other aspects can include the following features. The first pin thread and the second pin thread can be variable-pitch threads.

An aspect combinable with any of the other aspects can include the following features. The maximum pitch of the first pin thread can be greater than a maximum pitch of the second pin thread.

Certain aspects of the subject matter herein can be implemented as a method. The method includes providing a connector that includes a box with a first box thread having first pitch and that is disposed on an interior surface of the box. The connector also includes a second box thread disposed on the interior surface that has a pitch different than the first pitch. The method also includes providing a tubular joint that includes a first pin thread disposed on an external surface of the pin. The first pin thread has pitch the same as the first box thread. The pin also includes a second pin thread disposed between the first pin thread and an unthreaded portion of the tubular joint. The pitch of the second pin thread is the same as the second box thread. An elastomeric seal ring comprising a material that swells in the presence of hydrocarbons is disposed around the tubular joint between the first pin thread and the second pin thread. The pin is engaged with the box such that the first pin thread engages with the first box thread, the second pin thread engages with the second box thread, and the elastomeric seal ring forms a metal-to-elastomer seal between the first pin thread and the second pin thread, thereby forming a tubular connection of the tubular joint with the connector.

An aspect combinable with any of the other aspects can include the following features. Disposing the elastomeric seal ring can include disposing the elastomeric seal ring in a groove disposed about the exterior surface of the pin between the first pin thread and the second pin thread.

An aspect combinable with any of the other aspects can include the following features. The pin can be tapered with respect to a longitudinal axis of the tubular joint.

An aspect combinable with any of the other aspects can include the following features. The first pin thread can be a buttress thread.

An aspect combinable with any of the other aspects can include the following features. The first pin thread can be dimensioned so as to be compatible with a box thread of a standard American Petroleum Institute (API) coupling.

An aspect combinable with any of the other aspects can include the following features. The first pin thread can have a length along a longitudinal axis of the tubular joint that is substantially equivalent to a length along a longitudinal axis of a tubular joint of a standard American Petroleum Institute (API) coupling.

An aspect combinable with any of the other aspects can include the following features. The first pin thread and the second pin thread can be constant-pitch threads.

An aspect combinable with any of the other aspects can include the following features. The first pitch can be greater than the second pitch.

An aspect combinable with any of the other aspects can include the following features. The tubular joint can be disposed in a wellbore after forming the tubular connection.

An aspect combinable with any of the other aspects can include the following features. The tubular joint can be a first tubular joint and the pin can be a first pin. The box can be a first box and the connector can include a second box. The method can further include providing a second tubular joint comprising a second pin and engaging the second pin with the second box.

The details of one or more embodiments are set forth in the accompanying drawings and the description below. Other features, objects, and advantages will be apparent from the description and drawings, and from the claims.

DETAILED DESCRIPTION

The details of one or more implementations of the subject matter of this specification are set forth in this detailed description, the accompanying drawings, and the claims. Other features, aspects, and advantages of the subject matter will become apparent from this detailed description, the claims, and the accompanying drawings.

In some standard connections (for example, standard American Petroleum Institute (API) connections), the capacity of the connection is a function of the critical dimensions of the thread and the number of perfectly engaged thread. However, less than 70% of a standard API thread is fully engaged at final make up. Whilst there is tight tolerance in connection dimension, variation in the number of engaged threads due to operational practices during make up can result in thread jump out under tensile load. This problem can be especially acute in large diameter tubulars (for example 18⅝" casings with buttress thread casing (BTC) connections). For example, for buttress threads where final make up is referenced to the base of triangle, if the connection process does not reach the base of the connection triangle, then thread engagement is less than perfect, thereby resulting in reduced carrying capacity of the connection and increased risk of thread jump out as tensile stress increases during deployment, pressure testing or during cementing operations. This concern can result in greater-than-expected average make up torque being used during the makeup process to get the connection to the base of the triangle. In the latter, although the required thread may be fully engaged, the higher torque can result in deformation of the engaged thread, thereby reducing its capacity and increasing the risk of thread jump out under tensile load.

In some embodiments of the present disclosure, by disposing additional threads in the runout portion of the connection, the tensile performance, thread engagement, compression efficiency, and/or sealing of threaded tubular connections (including, by way of example but without limitation, connections interchangeable with standard American Petroleum Institute (API) connections) and associated manufacturing and machining processes can be improved and/or optimized. By reducing the stress distribution in the last engaged thread (LET) under tensile load, the risk of jump out can be reduced. Such improvement or optimization can, in some embodiments, be accomplished without increasing overall coupling length. In some embodiments, casing length can be optimized without impacting the number of engaged threads and the mechanical performance of the connection. Some embodiments of the present disclosure can be applied to API short-thread connections, long-thread connections, buttress connections, and/or other proprietary or non-proprietary threads and/or coupled connections.

Figure 1A:
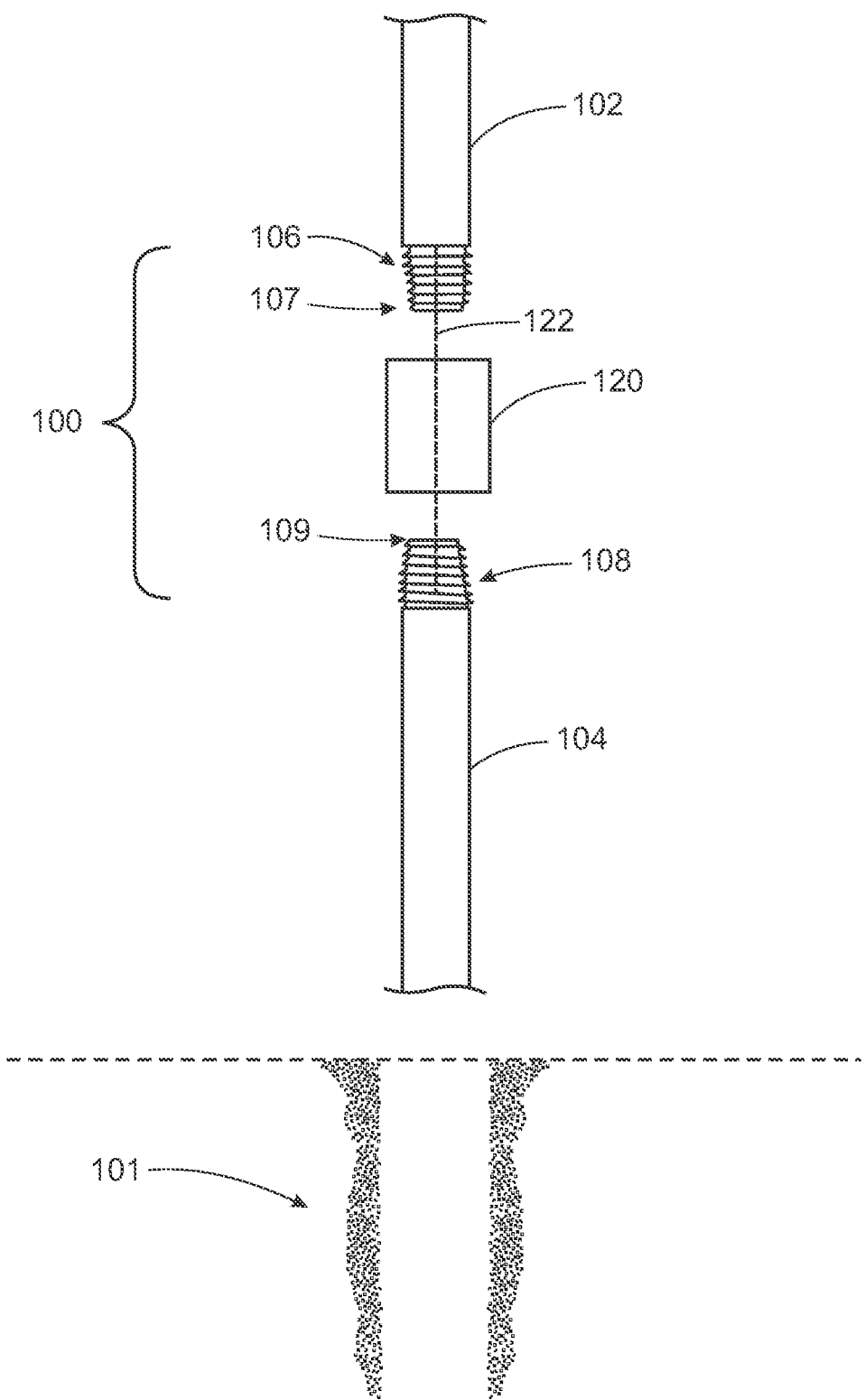
FIGS. 1A and 1B are schematic diagrams of a threaded connection of a tubular string in accordance with an embodiment of the present disclosure.
Figure 1B:
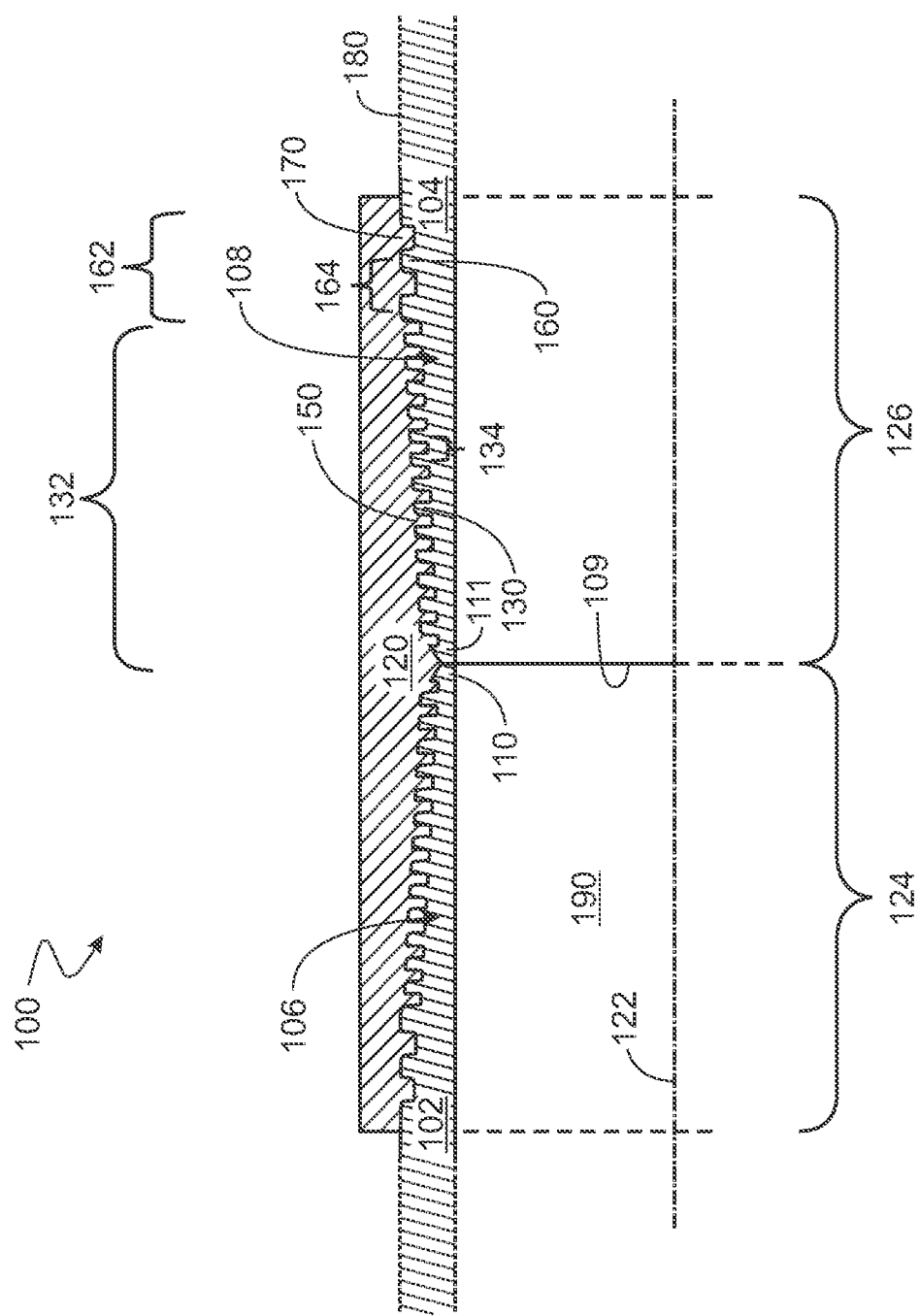

FIGS. 1A and 1B are schematic diagrams of a threaded connection 100 of a tubular string in accordance with an embodiment of the present disclosure. In the illustrated embodiment, as shown in FIG. 1A, the tubular string includes tubular joints 102 and 104 that can be joints of a casing string configured to be disposed in wellbore 101, with their respective central bores aligned along a common longitudinal axis 121. In some embodiments, tubular joints 102 and 104 can be joints of a production tubing string or another type of tubing string configured to be disposed in a wellbore. Threaded connection 100 is shown in its as-yet unconnected state. Tubular joint 102 includes a pin 106 at its distal end 107. Likewise, tubular joint 104 includes a pin 108 at its distal end 109. In the illustrated embodiment, each of tubular joints 102 and 104 are configured to be connected by inserting and rotating their respective pins 106 and 108 into a connector 120. (Tubular joints 102 and/or 104 can, in some embodiments, have a pin or a box or another suitable terminus at their respective other distal ends (neither of which are shown in FIG. 1A).) Connector 120 in the illustrated embodiment is relatively short, hollow, and substantially cylindrical in shape and, in the embodiment shown in greater detail in FIG. 1B, includes first and second opposing boxes with threads corresponding to threads of pins 106 and 108 of tubular joints 102 and 104, respectively. In some embodiments, the tubular string can include only one of tubular joints 102 or 104 or can include a greater number of tubular joints. In some embodiments, instead having dual opposing boxes as shown in FIGS. 1A and 1B, the connector can have a box at one end and a pin at its other end. In some embodiments, instead of a relatively short cylinder, the connector can be another tubular joint of similar dimensions (for example, length and/or internal diameter and/or external diameter) as tubular joints 102 and/or 104, with the connector (i.e., the other tubular joint of similar dimension as joint 102 and/or 104) having a box (at at least one of its ends) that includes box threads similar or the same as described below with respect to one of the boxes of connector 120 (as described in greater detail below), into which pin 106 (or 108) of tubular joint 102 (or 104) can be inserted.

FIG. 1B is a detailed cross-section of the threaded connection 100 of FIG. 1A in its made-up (connected) state in accordance with an embodiment of the present disclosure, showing the pin 106 and 108 of tubular joints 102 and 104 (respectively), made up within boxes 124 and 126 (respectively) of connector 120, forming a continuous bore 190 with a longitudinal axis 121 parallel to the axis of the bores of the tubular joints. Disposed about its exterior surface, tubular joint 104 includes a first pin thread 130 that is proximate to distal end 109 and a second pin thread 160 disposed between first pin thread 130 and the unthreaded portion 180 of tubular joint 104. Disposed about its interior surface, box 126 includes a first box thread 150 having a thread form corresponding to first pin thread 130 and a second box thread 170 having a thread form corresponding to second pin thread 160. Upon make-up of connection 100, first pin thread 130 engages with first box thread 140 and second pin thread 160 engages with second box thread 142. Mating pins 110 and 111 disposed at the distal ends of tubular joints 102 and 104 meet upon completion of the make-up.

In some embodiments, first pin thread 130 can be dimensioned to a standard API thread form or other standard or proprietary thread form, such that it is compatible with a box pin thread of such a standard or proprietary thread form, and can have a fully-engaged zone 132 with a longitudinal length (i.e., the length parallel to axis 121) that is equivalent to or substantially equivalent to the longitudinal length of the fully-engaged zone of such a standard or proprietary thread. In some embodiments, first pin thread 130 can be a buttress thread and include an API or other standard buttress connection's flat crest and root, and the load and the stabbing angle of the thread can conform to the specified connection tolerance. In some embodiments, the first thread portion of the connection can include same number of engaged load flanks as a standard API or proprietary connection. In some embodiments, first pin thread 130 can be another suitable thread form.

In the illustrated embodiment, pins 106 and 108 are tapered with respect to longitudinal axis 121. FIGS. 1A and 1B (and also FIG. 2, described below) are not drawn to scale and are not necessarily proportionate. Therefore, for example, a person skilled in the would understand, for example, that the taper of pins 106 and 108 can be greater than that shown, thereby accommodating engagement of pin threads 130 and 160 with box threads 150 and 170 during make-up without interference or jamming.

In some embodiments, second pin thread 160 can have a buttress thread form or other suitable thread form, and can be disposed in what otherwise would be the thread runout zone 162 of first pin thread 130. In the illustrated embodiment, pitch 164 (the distance between the crests of the thread, measured along the length of the thread) of second pin thread 160 is greater than the pitch 134 of first pin thread 130. The inclusion of threads 130 and 160 having different pitches in connection 100 can in some embodiments improve thread engagement and stress distribution, enhance tensile capacity and compression efficiency, and reduce in susceptibility of the connection to thread jump out under high tensile stress. Although in the illustrated embodiment pitch 164 is greater than pitch 134, in other embodiments the pitch 164 of second pin thread 160 can be lesser than pitch 134 of first pin thread 130.

In some embodiments, pitches 134 and 164 are constant-pitch threads. In some embodiments, one or both of pitches 134 and 164 can be variable-pitch threads. In embodiments wherein one or both of pitches 134 and 164 are variable-pitch threads, the maximum pitch of pitch 134 can be greater or lesser than the maximum pitch of pitch 164. In some embodiments of the present disclosure, a connection can include a greater number of threads of the same or different pitches and/or other thread form features. Furthermore, although the thread details described above are specifically described with respect to tubular joint 104 and box 126, the same or similar thread configuration can, in some embodiments, be included with tubular joint 102 and its respective pin 106 connected to box 124 or, in some embodiments, tubular joint 102 (and pin 106 and box 124) can have a different thread configuration than tubular joint 104 (and pin 108 and box 126).

In threaded connections in accordance with some embodiments of the present disclosure, the relative reduction in the length of exposed unengaged thread (as compared to standard connections) can reduce the risk of erosion and corrosion (for example, by inhibiting fluid leaks and/or by and reducing the risk of removal of phosphating or other corrosion protection coatings). Likewise, in some embodiments, the mating pins and the reduction in length of the exposed unengaged coupling can reduce exposure of unengaged portions of the connections to wellbore fluids and other sources of damage or corrosion.

In some embodiments, the inclusion of the second thread in the runout zone can result in a decrease in overall coupling length without sacrificing the overall number of engaged threads. This, in turn, can enable an increase the number of couplings manufactured per billet while still providing similar or better connection performance as standard threads, thereby providing a reduction in overall cost of coupling connection manufacture per ton.

Figure 2:
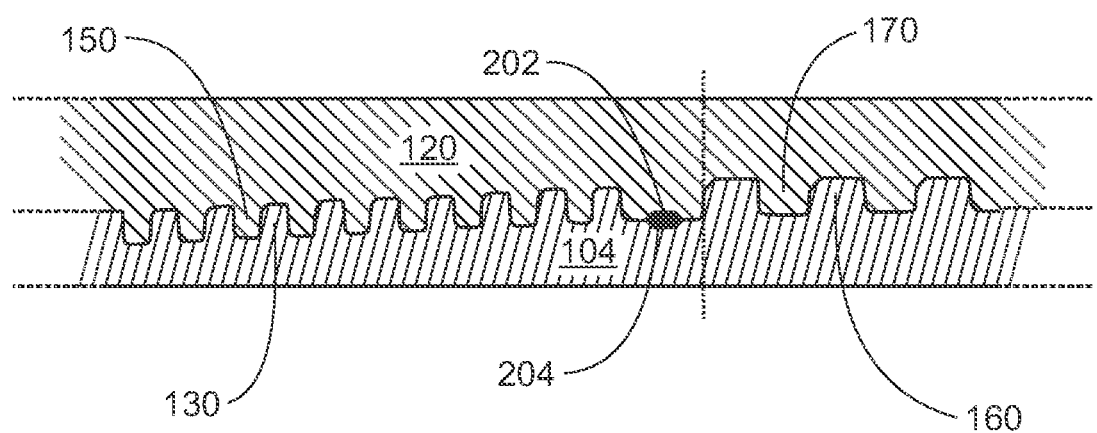
FIG. 2 is a detailed cross-section of the threaded connection of FIGS. 1A and 1B in accordance with an embodiment in which an elastomeric seal ring is disposed in the connection.

FIG. 2 is a detailed cross-section of threaded connection 100 of FIGS. 1A and 1B in accordance with an embodiment of the present disclosure in which an elastomeric seal ring 202 is disposed in the connection, around tubular joint 104 between first pin thread 130 and second pin thread 160. In the illustrated embodiment, seal ring 202 is disposed within a groove 204 disposed circumferentially about tubular joint 104. Seal ring 202 can be oval or polygonal in cross-section (or can have another suitable shape depending on the thread form(s) or other factors) to maximize seal contact without inducing additional stress in the connection and with dimensional tolerance such that there is interference fit between the pin and box of the connection at the seal ring. The seal ring can be composed of a polymeric material or other suitable material. In some embodiments, the seal ring can be comprised of a material that swells in the presence of hydrocarbons or other wellbore fluids such that the seal ring swells when the connection is disposed in a wellbore and the seal ring is exposed to hydrocarbon fluids that may enter the connection from the wellbore or from the interior of the tubular string. Suitable swellable materials can include, for example, natural rubber, ethylene-propylene-copolymer rubber, butyl rubber, butadiene rubber, isoprene rubber, or chloroprene rubber. In some embodiments, the material can be selected that swells in the presence of hydrocarbons but not in the presence of aqueous liquids (such as water-based mud). The seal metal-to-elastomer seal between the first and second pins can reduce the risk of erosion, corrosion, and leaks at the connection and reduce the risk of removal or phosphating or other corrosion protection.

Figure 3:
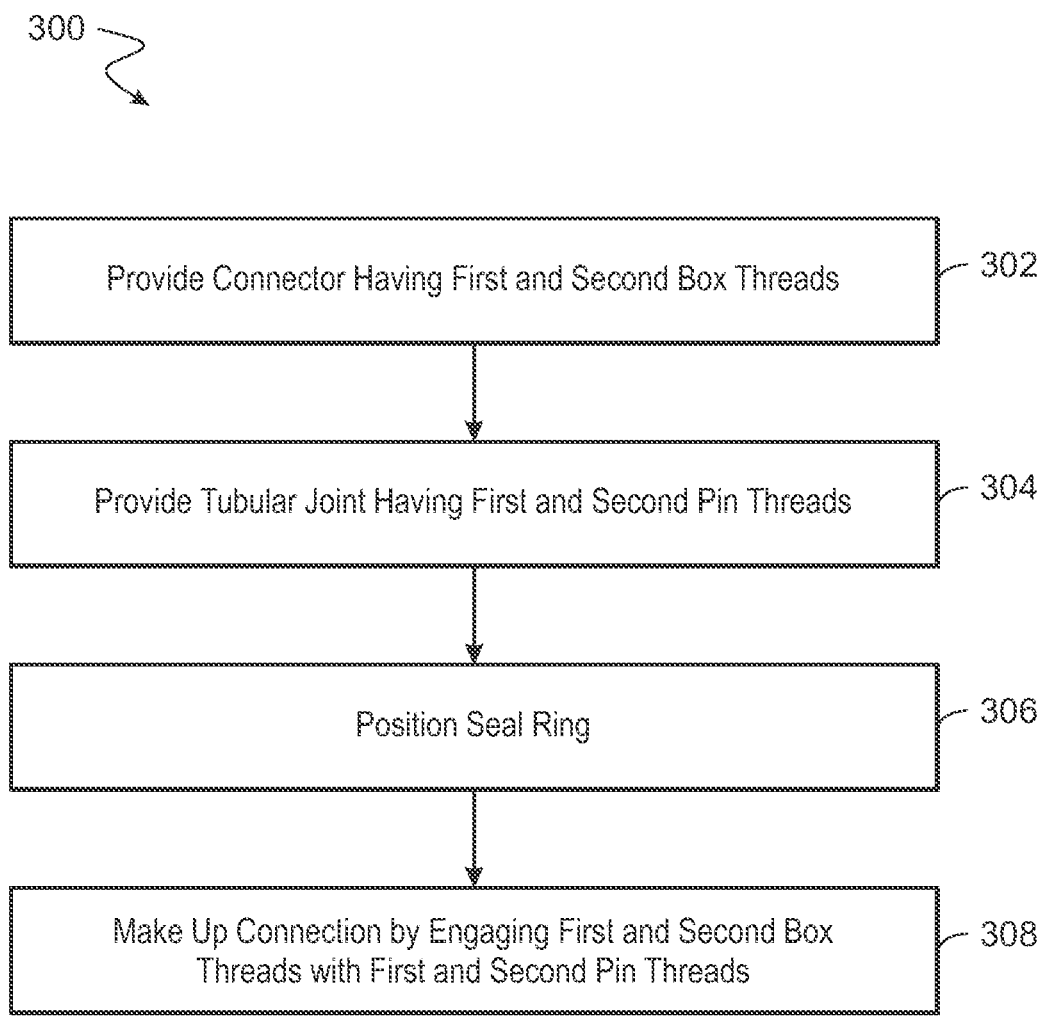
FIG. 3 is a process flow diagram of a method of forming a tubular connection in accordance with an embodiment of the present disclosure.

FIG. 3 is a process flow diagram of a method 300 of forming a tubular connection in accordance with an embodiment of the present disclosure. The method begins at step 302 in which an operator (or other suitable person) provides a tubular joint at a suitable location. Such a suitable location can be, for example, a drilling rig at a wellsite for drilling a wellbore, at which wherein the tubular joints are to be made up as joints of a drillstring. During the makeup process, the tubular joints are screwed together as the well is drilled.

The method begins at step 302 in which an operator provides a connector by attaching the connector to an exposed threaded connection of a bottomhole assembly or tubular string already disposed within the wellbore. The connector can be, for example, a connector 120 as described above in reference to FIGS. 1A, 1B, and 2. Accordingly, the connector can include a box with a first box thread disposed on its interior surface and having a first pitch and a second box thread disposed on the interior surface and having a second pitch different from the first pitch.

Proceeding to step 304, the operator provides a tubular joint by, for example, picking up the tubular joint by connecting its top end to a Kelly or top drive assembly and lowering the tubular joint such that it is just above the box of the connector. The tubular assembly can be, for example, tubular assembly 102 as described above, including a pin at its distal end. The pin includes a first pin thread disposed on an external surface of the pin that has a pitch that matches the first pitch of the connector. The pin also includes a second pin thread disposed on its external surface between the first pin thread and an unthreaded portion of the tubular joint. The second pin thread has a pitch that matches the second pitch of the connector.

Proceeding to step 306, an elastomeric seal ring such as seal ring 202 (comprised of, in some embodiments, a hydrocarbon-swellable material) is provided and positioned (disposed) around the tubular joint between the first pin thread and the second pin thread, prior to inserting the tubular joint in the connector to form the connection. In some embodiments, the seal ring is disposed around the tubular joint at the wellsite. In some embodiments, the elastomeric seal ring is disposed around the tubular joint during the assembly process of the tubular joint at, for example, a manufacturing or assembly facility at a different location than the wellsite, prior to the tubular joint being transported to the wellsite (such that step 306 occurs prior to step 302). In some embodiments, instead of being first disposed around the tubular joint prior to forming of the connection, the seal ring is first disposed within the connector (between the first and second box threads), either at the wellsite or at a manufacturing or assembly facility, prior to inserting the tubular joint in the connector to form the connection.

Proceeding to step 308, the connection is made up by lowing the tubular joint until it contacts the connector and rotating the joint with respect to the connector, thereby engaging the pin with the box such that the first pin thread engages with the first box thread, the second pin thread engages with the second box thread, and the elastomeric seal ring forms a metal-to-elastomer seal between the first pin thread and the second pin thread.

In this disclosure, "substantially" means a deviation or allowance of up to 10 percent (%) and any variation from a mentioned value is within the tolerance limits of any machinery used to manufacture the part. A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A threaded tubular connection comprising:
    a tubular joint configured to be disposed within a wellbore and comprising:
        a pin at a distal end of the tubular joint;
        a first pin thread disposed on an external surface of the pin, the first pin thread having a first pitch, wherein the first pin thread is dimensioned so as to be compatible with a box thread of a standard American Petroleum Institute (API) coupling and has a length along a longitudinal axis of the tubular joint that is substantially equivalent to a length along a longitudinal axis of a tubular joint of the standard API coupling; and
        a second pin thread disposed on the external surface of the pin between the first pin thread and an unthreaded portion of the tubular joint, the second pin thread having a second pitch different from the first pitch, wherein the second pin thread has a length along the longitudinal axis that is substantially equivalent to a length of a runout zone of the standard API coupling;
    an elastomeric seal ring that comprises a material that swells in response to the presence of hydrocarbons and does not swell in response to the presence of an aqueous solution, the material comprising at least one of:
        natural rubber;
        ethylene-propylene-copolymer rubber;
        butyl rubber;
        butadiene rubber;
        isoprene rubber; and
        chloroprene rubber; and
    a connector, the connector comprising:
        a box:
        a first box thread disposed on an interior surface of the box and having the first pitch; and
        a second box thread disposed on the interior surface of the box and having the second pitch, wherein the connection is configured such that, upon make-up of the connection:
            the first pin thread engages with the first box thread;
            the second pin thread engages with the second box thread; and
            the elastomeric seal ring is disposed around the tubular joint between the first pin thread and the second pin thread and forms a metal-to-elastomer seal between the tubular joint and the connector.

2. The threaded tubular connection of claim 1, wherein the elastomeric seal ring is disposed in a groove disposed about the exterior surface of the pin between the first pin thread and the second pin thread.

3. The threaded tubular connection of claim 1, wherein the pin is tapered with respect to a longitudinal axis of the tubular joint.

4. The threaded tubular connection of claim 1, wherein the first pin thread is a buttress thread.

5. The threaded tubular connection of claim 1, wherein the first pin thread and the second pin thread are constant-pitch threads.

6. The threaded tubular connection of claim 5, and wherein the first pitch is greater than the second pitch.

7. The threaded tubular connection of claim 1, wherein the first pin thread and the second pin thread are variable-pitch threads.

8. The threaded tubular connection of claim 7, and wherein a maximum pitch of the first pin thread is greater than a maximum pitch of the second pin thread.

9. The threaded tubular connection of claim 1, wherein a dimensional tolerance of the connection is such that there is interference fit between the pin and box at the seal ring.

10. A method comprising:
    providing a connector, the connector comprising:
        a box:

a first box thread disposed on an interior surface of the box and having a first pitch; and a second box thread disposed on the interior surface of the box and having a second pitch different from the first pitch;

providing a tubular joint, the tubular joint comprising:

a pin at a distal end of the tubular joint;

a first pin thread disposed on an external surface of the pin, the first pin thread having the first pitch, wherein the first pin thread is dimensioned so as to be compatible with a box thread of a standard American Petroleum Institute (API) coupling and has a length along a longitudinal axis of the tubular joint that is substantially equivalent to a length along a longitudinal axis of a tubular joint of the standard API coupling; and a second pin thread disposed on the external surface of the pin between the first pin thread and an unthreaded portion of the tubular joint, the second pin thread having the second pitch, wherein the second pin thread has a length along the longitudinal axis that is substantially equivalent to a length of a runout zone of the standard API coupling;

disposing an elastomeric seal ring around the tubular joint between the first pin thread and the second pin thread, wherein the elastomeric seal ring comprises a material that swells in response to the presence of hydrocarbons and does not swell in response to the presence of an aqueous solution, the material comprising at least one of:

natural rubber;
ethylene-propylene-copolymer rubber;
butyl rubber;
butadiene rubber;
isoprene rubber; and
chloroprene rubber; and engaging the pin with the box such that the first pin thread engages with the first box thread, the second pin thread engages with the second box thread, and the elastomeric seal ring forms a swellable metal-to-elastomer seal between the first pin thread and the second pin thread, thereby forming a tubular connection of the tubular joint with the connector.

11. The method of claim 10, wherein disposing the elastomeric seal ring comprises disposing the elastomeric seal ring in a groove disposed about the exterior surface of the pin between the first pin thread and the second pin thread.

12. The method of claim 10, wherein the pin is tapered with respect to a longitudinal axis of the tubular joint.

13. The method of claim 10, wherein the first pin thread is a buttress thread.

14. The method of claim 10, wherein the first pin thread and the second pin thread are constant-pitch threads.

15. The method of claim 14, and wherein the first pitch is greater than the second pitch.

16. The method of claim 10, further comprising disposing the tubular joint in a wellbore after forming the tubular connection.

17. The method of claim 10, wherein:
the tubular joint is a first tubular joint:
the pin is a first pin:
the box is a first box; and
the connector comprises a second box,
and further comprising:
providing a second tubular joint comprising a second pin;
engaging the second pin with the second box.

18. The method of claim 10, wherein a dimensional tolerance of the connector is such that there is interference fit between the pin and box at the seal ring.

* * * * *